United States Patent [19]
Johnson et al.

[11] Patent Number: 5,485,431
[45] Date of Patent: Jan. 16, 1996

[54] MEASUREMENT OF NONLINEAR FORMATION PARAMETERS USING SONIC BOREHOLE TOOL

[75] Inventors: David L. Johnson, Danbury; Sergio Kostek, Ridgefield, both of Conn.; Andrew Norris, Mountainside, N.J.

[73] Assignee: Schlumberger Technology Corporation, Ridgefield, Conn.

[21] Appl. No.: 154,645

[22] Filed: Nov. 19, 1993

[51] Int. Cl.$^6$ .................................................. G01V 1/40
[52] U.S. Cl. ........................... 367/30; 367/31; 367/32; 364/422
[58] Field of Search ................... 367/30-32; 181/105; 364/422

[56] References Cited

U.S. PATENT DOCUMENTS

| | | | |
|---|---|---|---|
| 4,779,236 | 10/1988 | Sondergeld | 367/31 |
| 5,081,611 | 1/1992 | Hornby | 367/25 |

OTHER PUBLICATIONS

Kostek, S., PHD Thesis, 1993, MIT, Diss. Abstr Int., Sect. B, vol. 54, No. 6, p. 2959–B.
Cicerone et al, 60th Annu. SEG Int. Mtg, Sep. 27, 1990, vol. 1, pp. 129–1320.
"Numerical Evaluation of the Transient Acoustic Waveform Due to a Point Source in a Fluid–Filled Borehole", Tsang and Rader, Geophysics 44, No. 10, pp. 1706–1720 (1979).
"Acoustic Multipole Sources in Fluid–Filled Boreholes", Kurkjian and Chang, Geophysics 51, No. 1, pp. 148–163 (1986).
"Interaction of Elastic Waves in a Isotropic Solid", Jones & Kobbet, Jour. Acoustic Soc. Am. 35, No. 1, pp. 5–10 (1963).
"Ultrasonic Study of Three–Phonon Interactions. I. Theory", Taylor & Rollins, Phys. Rev, 136, No. 3A, pp. 591–596 (1964).
"Non–Linear Phenomena in the Propagation of Elastic Waves in Solids", Zarembo & Kresilnikov, Sov. Phys. USP. 13, No. 6, pp. 778–797 (1971).
"Harmonic Generation of Longitudinal Elastic Waves", Thompson and Tiersten, J. Acoust. Soc. AM 62, No. 1, pp. 33–37 (1977).
"Non–Linear Rayleigh Waves: Harmonic Generation, Parametric Amplification and Thermoviscous Damping", Lardner, J. Appl. Phys. 55 No. 9, pp. 3251–3260 (1984).
"Nonlinear Properties of Rayleigh and Staneley Waves in Solids," Shui & Solodov, J. Appl. Phys. 64, No. 11, pp. 6155–6165 (1988).
"Second–Order Elastic Deformation of Solids", Hughes & Kelly, Phys. Rev. 92, No. 5 pp. 1145–1149 (1953).
"Third Order Elastic Constants and the Velocity of Small Amplitude Elastic Waves in Homogeneously Stressed Media", Thurston & Brugger, Phys. Rev. 133, No. 6A, pp. 1604–1610 (1964).
"Soundwaves in Deformed Perfectly Elastic Materials, Acoustoelastic Effect," Toupin & Bernstein, J. Acoust. Soc. Am 33, No. 2, pp. 216–225 (1961).
"Parameter of Nonlinearity in Fluids II", Coppens et al, J. Acoust. Soc. Am 38, pp. 797–804 (1965).

(List continued on next page.)

Primary Examiner—Nelson Moskowitz
Attorney, Agent, or Firm—David P. Gordon; Leonard W. Pojunas; Martin D. Hyden

[57] ABSTRACT

Methods and apparatus are provided for determining an indication of a nonlinear property of the formation. A sonic tool is used in a borehole to generate a signal having multiple cycles of a wave of a predetermined frequency. The amplitude of a tube wave resulting from the signal is measured. The measured amplitude is then used to determine an indication of the nonlinearity of the formation according to a relationship which relates the measured amplitude to the amplitude of a second harmonic tube wave which is generated in the borehole by the tube wave of the predetermined frequency due to the nonlinear property of the formation. The indication of nonlinearity may then be utilized to give an indication of the relative consolidation of the formation surrounding the borehole.

24 Claims, 4 Drawing Sheets

OTHER PUBLICATIONS

"Pressure & Temperature Dependence of the Acoustic Velocities in Polymethylmethacrylate," Asay et al, J. Appl. Phys. 40, No. 4, pp. 1768–1783 (1969).

"Third Order Elastic Constants of Ge, MgO, and Fused SiO$_2$," Bogardus, J. Appl. Phys. 38, No. 8, pp. 2504–2513 (1965).

"Third–Order Elastic Moduli of Polycrystalline Metals from Ultrasonic Velocity Measurements," Smith et al., J. Acoust. Soc. Am 40, No. 5, pp. 1002–1008 (19660).

"Ultrasonic Wave Velocities in Stressed Nickel Steel," Crecroft, Nature 195, pp. 1193–1194 (1962).

"Third Order Elastic Constants of Single—Crystal and Polycrystalline Columbium", Graham et al. J. Appl. Phys. 39, No. 7, pp. 3025–3033 (1968).

"Sound Velocity Measurements at High Pressures," Mongomery et al, Rev. Sci Instr. 38, No. 8, pp. 1073–1076 (1967).

"Velocity of Seismic Waves in Porous Rocks" Toksöz et al, Geophysics 41, No. 4, pp. 621–645 (1976).

Linear & Nonlinear Waves, Whitham, John Wiley & Sons New York 1974.

"Parameter of Nonlinearity in Fluids," Beyer, J. Acoust. Soc. Am 32, No. pp. 719–721 (1960).

"Thermodynamic Definition of Higher Order Elastic Constants", Brugger, Phys. Rev. 133, No. 6A pp. 1611–1612 (1964).

"Finite Deformations of an Elastic Solid", Murnaghan, Chapman & Hall, N.Y. 1951 pp. 89–95.

Ultrasonic Investigation of Mechanical Properties, Green, Academic Press, N.Y., 1973, pp. 73–145.

"Wave Velocities in Rocks as a Function of Changes in Overburden Pressure and Pore Fluid Saturants", King, Geophysics 31 No. 1, pp. 50–73 (1966).

"Interaction of Plane Longitudinal & Transverse Elastic Waves", Sov. Phys. Acoust. 6, pp. 306–310 (1961).

Nonlinear Generation of Elastic Waves in Granite & Sandstone: Continuous Wave and Travel Time Observations, Johnson et al, J. Geophysics Res. B. 94, pp. 17729–17733 (1989).

Continuous Wave Phase Detection for Probing Nonlinear Elastic Wave Interactions in Rocks, Johnson et al. J. Acoust. Soc. Am. 89, No. 2, pp. 598–603 (1991).

"Nonlinear Generation of Elastic Waves in Chrystalline Rock", Johnson et al, J. Geophysics Res. B. 92, pp. 3597–3602 (1987).

Physical Ultrasonics, Beyer et al, Academic Press, N.Y. (1969) vol. 32 of Pure and Applied Physics.

Theory of Elasticity, Landau et al, Pegamon Press, Oxford 1986 3rd Edition pp. 106–107.

Pressure Derivatives of the Sound Velocities of Polycrystalline Alumina, Schreiber et al, Jour. Amer. Ceram. Soc. 49, pp. 184–190 (1960).

MEASUREMENT OF NONLINEAR FORMATION PARAMETERS USING SONIC BOREHOLE TOOL

BACKGROUND OF THE INVENTION

1. Field of the Invention

This invention relates broadly to methods and apparatus for investigating subsurface earth formations. More particularly, this invention relates to sonic borehole tools and methods for measuring a nonlinear parameter of an earth formation. The invention has particular application in using the nonlinear parameter measurement for distinguishing between well consolidated and poorly consolidated rocks, which information is useful in the production of oil from the formation.

2. State of the Art

The art of sonic well logging for use in determining formation parameters is a well established art. Sonic well logs are typically derived from sonic tools suspended in a mud-filled borehole by a cable. The tools typically include a sonic source (transmitter) and a plurality of receivers which are spaced apart by several inches or feet. Typically, a sonic signal is transmitted from the transmitter at one longitudinal end of the tool and received by the receivers at the other, and measurements are made every few inches as the tool is drawn up the borehole. The sonic signal from the transmitter or source enters the formation adjacent the borehole, and the arrival times of the compressional (P-wave), shear (S-wave) and Stoneley (tube) waves are detected by the receivers. The receiver responses are typically processed in order to provide a time to depth conversion capability for seismic studies as well as for providing the determinations of formations parameters such as porosity.

It is well established in the sonic well logging arts that the acoustic signal which is transmitted in the borehole and the formation is composed of many different components. In particular, it is known that if the source has an axially symmetric component, at low frequencies (i.e., where the wavelength is large compared to the borehole radius), the dominant contribution to the acoustic signal is due to the lowest lying "mode" which is known as the "tube" or Stoneley wave. Typically, the tube wave is assumed to be a nondispersive wave having a speed $V_T$ which is expressed in terms of the properties of the fluid (borehole mud) and the solid (formation). Measurements of the tube wave are typically used for making permeability determinations. In addition, because tube waves are reflected by fractures in the formation, tube waves are also used in locating formation fractures for purposes of oil production.

While the measurement of the compressional, shear, and tube waves are useful in quantifying various parameters of the formation, it will be appreciated that to date, there has been no successful mechanism for making an in situ determination of the relative state of the consolidation of the formation. Whether a layer of a formation is well or poorly consolidated, however, can broadly affect the producibility of the formation, as well as the manner in which production is to be carried out.

SUMMARY OF THE INVENTION

It is therefore an object of the invention to provide a measurement of the consolidation of a formation traversed by a borehole.

It is another object of the invention to relate the nonlinearity of the system of borehole fluid and solid formation to a measurement of the relative consolidation of a formation.

It is a further object of the invention to utilize sonic measurements of a second harmonic tube wave in order to determine the nonlinearity of the formation.

For purposes of this invention, it should be understood that the term "nonlinear" when used to describe a material relates to the fact that a plot of stress versus strain in a material will exhibit some nonlinear behavior. The more nonlinear the stress versus strain plot is, the more nonlinear the material is said to be.

In accord with the objects of the invention, a method for determining an indication of a nonlinear property of the formation is provided. The method broadly comprises using a sonic tool in a borehole to generate a signal having multiple cycles of a wave of a predetermined frequency and to measure the amplitude of a resulting tube wave, and utilizing the measured amplitude to determine an indication of the nonlinearity of the formation. The indication of nonlinearity of the formation is determined according to a relationship which relates the measured amplitude to the amplitude of a harmonic tube wave having a frequency which is a multiple of the predetermined frequency and which is generated in the borehole by the tube wave and due to the nonlinear property of the formation. The indication of nonlinearity may then be utilized to give an indication of the relative consolidation of the formation surrounding the borehole.

The indication of the nonlinearity of the formation is preferably substantially determined according to a low frequency (e.g., $\leq 1$ KHz) perturbation-derived relationship:

$$p(z,t)=P_0 \cos (k|z|-w_o t)+P_0^2[(\alpha V_T w_o/4)| z| \sin (2k|z|-2w_o t)+ (\alpha V_T^2-2N_1/8) \cos (2k|z|-2w_o t)] \quad (1)$$

where $p(z,t)$ is the measured acoustic pressure (p) over time (t) at a receiver at a distance (z) from the sonic source, $\alpha$ is a parameter which is a function of the nonlinearity of the formation, $w_o$ is the frequency of the sonic source, $V_T$ is the tube wave velocity, $P_0$ is the maximum amplitude of the tube wave at the fundamental frequency, $k=w_o/V_T$, and $N_1$ is the linear compliance of the borehole wall. It should be appreciated that the first term on the right hand side of the relationship set forth above represents the amplitude of the fundamental tube wave, while the second term represents the amplitude of the second harmonic tube wave at frequency $2w_o$. Higher order terms are ignored.

According to preferred aspects of the invention, in determining the indication of the nonlinearity of the formation, the measured acoustic pressure $p(z,t)$ is Fourier transformed and filtered to find the amplitude of the second harmonic. The Fourier equivalent of relationship (1) is then used in solving for the $\alpha$ term which is indicative of nonlinearity of the system. While different methods may be used to obtain a solution, according to a preferred method, the amplitude of the tube wave at the fundamental frequency $P_0$ should be known. Thus, the receiving transducer is preferably calibrated to relate a voltage to a pressure amplitude, although the transmitting transducer may be calibrated in lieu thereof. In addition, information must be obtained regarding the linear compliance of the borehole wall ($N_1$). Linear compliance may be obtained either by relating $N_1$ to the tube wave velocity and to the density and bulk modulus of the borehole fluid (mud) according to $1/V_T^2=\rho((1/A_f)+N_1)$, where $\rho$ is the density of the borehole fluid and $A_f$ is the bulk modulus of the borehole fluid, or by taking $N_1$ as being the inverse of the shear modulus of the formation. The shear modulus of the formation can typically be obtained by shear wave logging.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
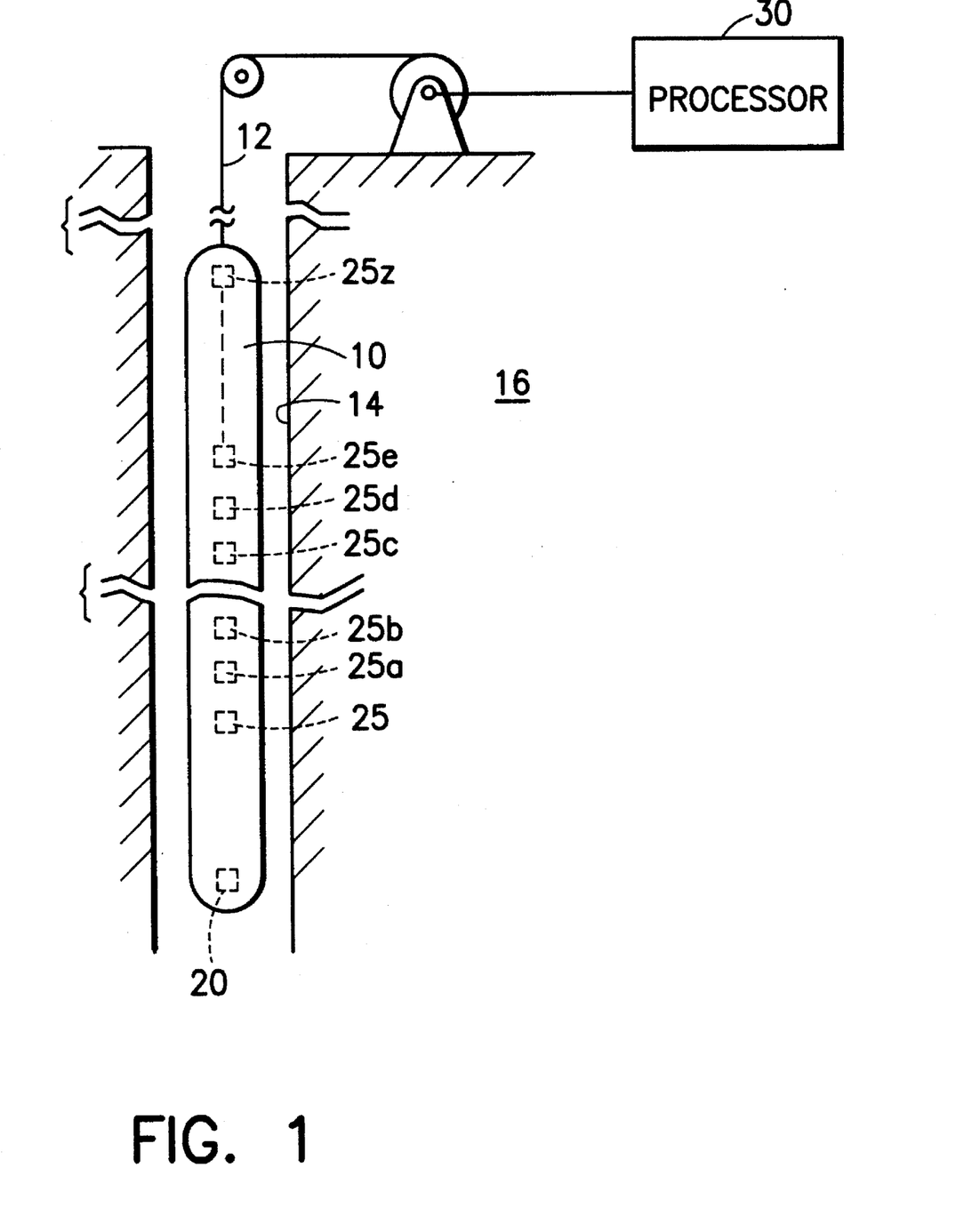
FIG. 1 is a schematic diagram of a sonic logging tool located in a borehole of a formation.

A sonic logging tool 10 which is suspended from a conventional wireline cable 12 is seen in FIG. 1. The sonic logging tool 10 is located in a borehole 14 which traverses a formation 16. The sonic logging tool includes a transmitter (transmitting transducer) 20 and at least one receiver (detecting pressure transducer) 25. In accord with the invention, the transmitter 20 is capable of a generating either a pulse signal (e.g., multiple cycles of a wave), or a continuous wave at a desired frequency. For purposes that will be described in more detail hereinafter, the transmitter is preferably a transducer having an axially symmetric component. The transmitter is typically located downhole from the receiver(s), and where more than one receiver is provided, the receivers are generally arranged in a longitudinal array. As is well known in the art, each receiver is a pressure transducer which provides as an output an indication of the pressure seen by the transducer as a function of time. Typically in the sonic arts, and in accord with the present invention, a signal is generated by the transmitter, and the resulting pressure signal detected by the receiver is recorded and processed. The processing may occur downhole by use of a processor (not shown) and/or uphole in processing equipment 30; the information being transmitted uphole via the wireline cable 12. Typically, if processed downhole, a microprocessor is used. When processing uphole, a higher powered processor such as a VAX produced by Digital Equipment Corporation of Brainard, Mass. is used.

Before turning to the manner in which the data obtained at the receivers are processed, it is instructive to examine some aspects of the theoretical basis of the invention. A complete theoretical analysis is attached hereto as Appendix A.

It is the thesis of this invention that the nonlinearity of the formation is a measure of the relative consolidation of the formation. In other words, a relatively consolidated formation will exhibit a smaller degree of nonlinearity than a relatively unconsolidated formation. That the nonlinearity of the formation relates to the consolidation of the formation may be appreciated by considering how the speed of longitudinal (compressional) sound $V_P$ and transverse (shear) sound $V_S$ change with application of a confining pressure in different materials. In particular, using the Landau and Lifschitz convention (L. D. Landau and E. M. Lifshitz, *Theory of Elasticity* (Pergamon Press, Oxford, 1986, 3rd ed.) pp. 106–107), for the third order constants, A, B, and C, the following relationships relating the constants to the speed of the sound in the medium are known:

$$\rho_S \frac{dV_S^2}{dP} = -\frac{3\lambda + 6\mu + A + 3B}{3\lambda + 2\mu}, \quad (2)$$

$$\rho_S \frac{dV_P^2}{dP} = -\frac{7\lambda + 10\mu + 2A + 10B + 6C}{3\lambda + 2\mu} \quad (3)$$

where $\lambda$ and $\mu$ are the Lamé constants of the solid, and $\rho_S$ is the density of the solid in the undeformed state. The following table, gleaned from several sources, lists some dimensionless values of sound speed for some common materials:

| Material | $\rho_s dV_s^2/dP$ | $\rho_s dV_p^2/dP$ |
| --- | --- | --- |
| Water | 0 | 5.0 |
| Benzene | 0 | 9.0 |
| Polystyrene | 1.57 | 11.6 |
| PMMA | 3.0 | 15.0 |
| Pyrex | −2.84 | −8.6 |
| Fused Silica | −1.42 | −4.32 |
| Alumina | 1.12 | 4.46 |
| Aluminum | 2.92 | 12.4 |
| Nickel-Steel | 1.55 | 2.84 |
| Armco-Iron | 5.7 | 9.3 |
| Steel (Hecla) | 1.46 | 7.45 |
| Molybdenum | 1.05 | 3.48 |
| Tungsten | 0.70 | 4.58 |
| Magnesium | 1.47 | 6.89 |
| Niobium | 0.29 | 6.18 |
| Gold | 0.90 | 6.4 |

Figure 2A:
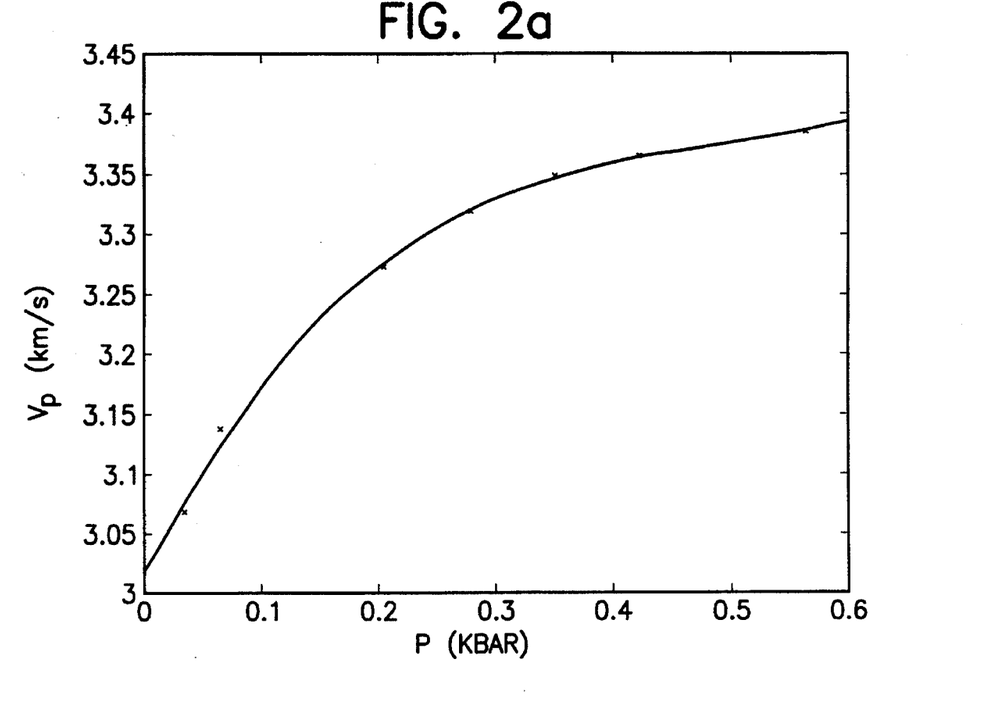
FIGS. 2a and 2b are plots of the longitudinal and transverse speeds of sound for a dry Boise Sandstone as a function of pressure.
Figure 2B:
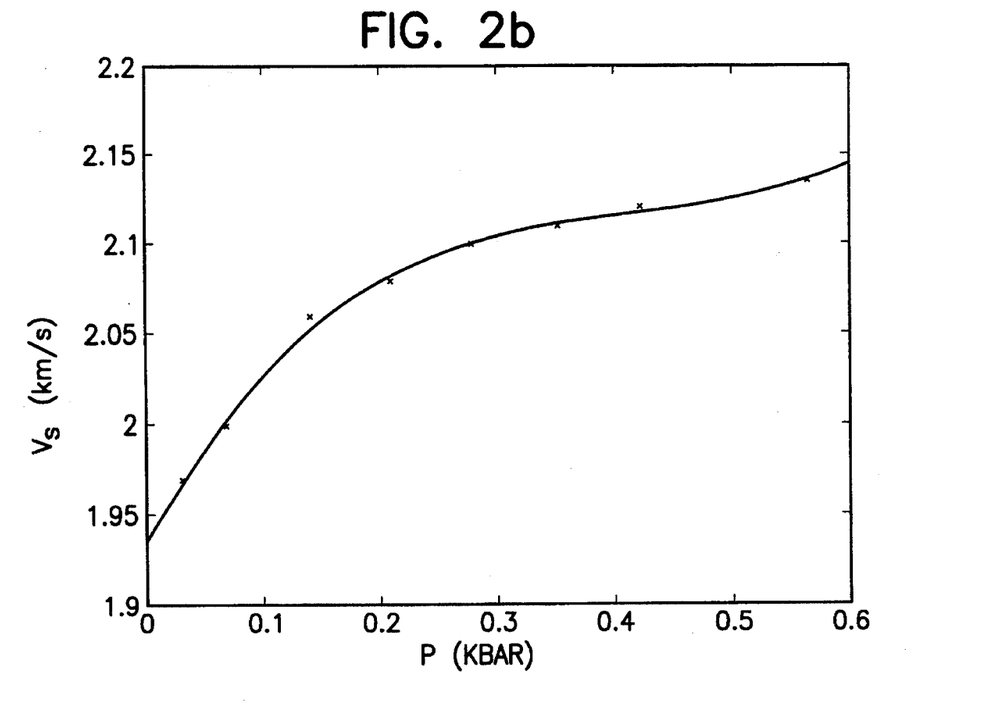
Figure 3A:
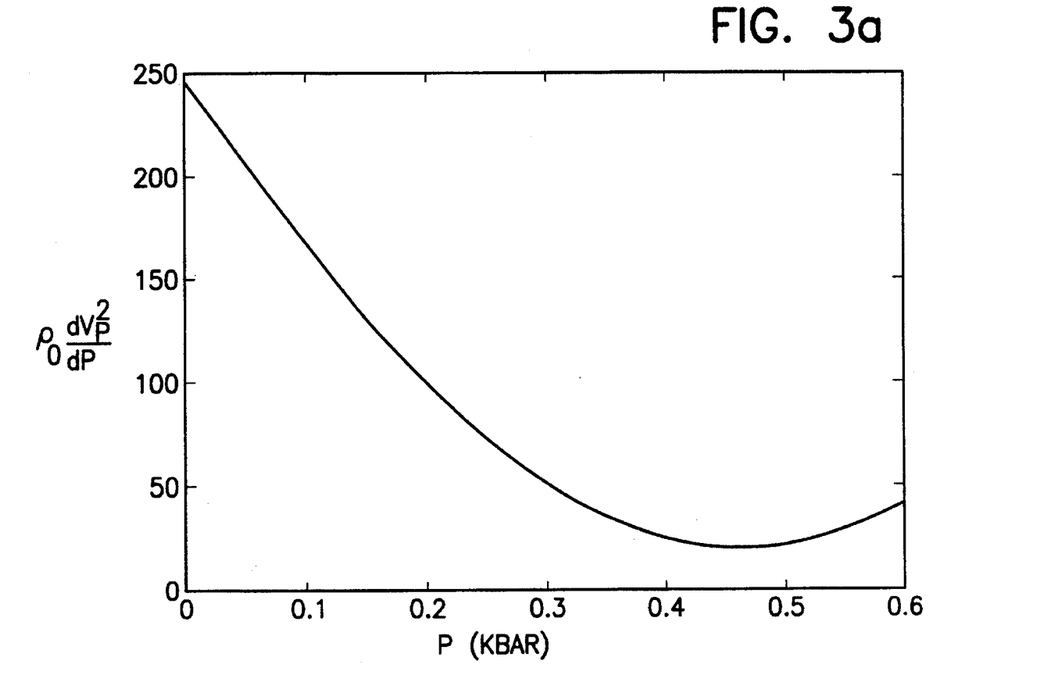
FIGS. 3a and 3b are plots derived from FIGS. 2a and 2b of dimensionless quantities as a function of pressure, where the dimensionless quantities relate to nonlinear aspects of the Boise Sandstone.
Figure 3B:
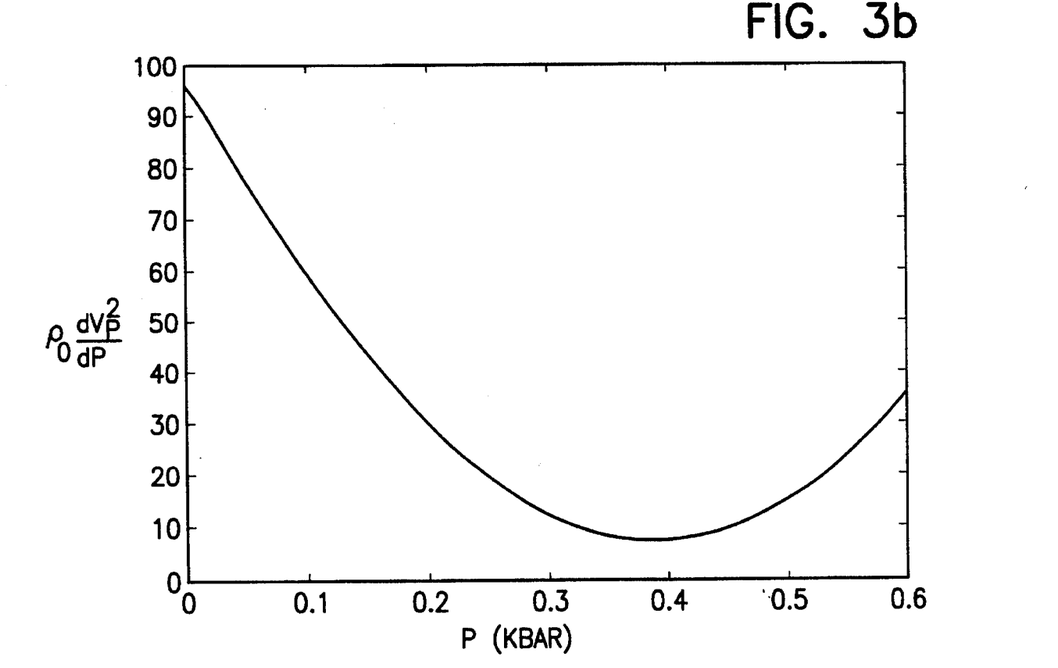

The dimensionless values for the speed of sound in rocks, however, are often at least an order of magnitude larger than those values set forth above. For example, the speed of sound for a dry Boise Sandstone as a function of pressure is seen in FIGS. 2a and 2b (as taken from M. N. Toksoz, C. H. Cheng, and A. Timur, "Velocities of Seismic Waves in Porous Rocks" *Geophysics* 41, pp. 621–645 (1976)), where the smooth curve is a simple polynomial fit to the data for the purpose of taking a derivative. From FIGS. 2a and 2b, the dimensionless derivative values $\rho_S dV_S^2/dP$, and $\rho_S dV_P^2 dP$ are derived and plotted in FIGS. 3a and 3b. As seen in FIGS. 3a and 3b, the dimensionless values are much greater than those found for the consolidated materials listed above. Moreover, by using expressions similar to equations (2) and (3) which apply to the case of a uniaxially applied stress, values for the second and third order elastic constants for the Berea Sandstone were deduced as: $\mu=3.66$; $\rho_S=0.41$; A=−4520; B=−1850; and C=−1660. Thus, it is believed that poorly consolidated materials exhibit large nonlinear parameters, which according to the invention, and as set forth more completely below, are determinable in part by measuring the second harmonic of the tube wave.

The relationship between the nonlinearity of the formation, the cylindrical geometry of the borehole, and the measurement of the second harmonic is a complex one which is developed completely in Appendix A hereto. A simpler, shorter analysis, however, is also helpful in understanding the invention.

A starting point is the consideration of the quasi-static limit of a nonlinear tube wave which is in an infinitely long, fluid-filled cylinder of radius a in an elastic solid. The properties of the solid may vary radially but not axially or azimuthally. In considering the motion of the borehole wall and the fluid in the borehole, Eulerian variable terminology will hereinafter be used for fluid motion, while Lagrangian variable terminology will be used for solid motion. Thus $p(z,t)$, $\rho(z,t)$, and $v(z,t)$ are respectively the pressure, density, and axial velocity of the actual deformed fluid in the borehole at position z at time t, while $\underline{u}(\underline{r},t)$ is the displacement of a material particle in the solid which was originally at $\underline{r}$, and is now at position $\underline{r}+\underline{u}(\underline{r},t)$. The radial displacement of the borehole wall is thus denoted as $u(z,t)\equiv u_r(r=a,z,t)$. In the quasi-static limit, the radial component of the fluid motion is neglected as it is substantially smaller than the axial motion. Likewise, radial variations of pressure, density, and axial fluid velocity are also ignored.

In the defined low frequency system (e.g., 1 KHz or less for an eight inch borehole) where the radial dependence of the unknown quantities p, ρ, and v are ignorable because the wavelength is large compared to the borehole radius, the equations of motion and of state for the fluid in the borehole are:

$$(dv/dt + vdv/dz) + dp/dz = 0 \quad (4)$$

and $$p = A_f\left(\frac{\rho-\rho_o}{\rho_o}\right) + \frac{1}{2} B_f\left(\frac{\rho-\rho_o}{\rho_o}\right)^2 + \ldots \quad (5)$$

where p is the acoustic pressure (relative to the ambient), $\rho_o$ is the density of the fluid in the undeformed state, $A_f$ is the bulk modulus of the fluid, and $B_f$ is a nonlinear parameter of the borehole fluid. As is well known, the speed of small amplitude sound waves in a fluid is related to the ambient density and bulk modulus according to:

$$c = (A_f/\rho_o)^{1/2} \quad (6)$$

Inverting equation (5) and using equation (6) yields:

$$\rho = \rho_o + \frac{1}{c^2} p - \frac{B_f}{2c^2 A_f^2} p^2 + \ldots \quad (7)$$

Using equation (7), equation (4) can be rewritten as:

$$\rho_o dv/dt + dp/dz + (1/c^2)pdv/dt + \rho_o v dv/dz = 0 \quad (8)$$

As will be seen hereinafter, an approximation of equation (8) is useful in relating the nonlinearity of the formation to known or measurable parameters.

The continuity equation for fluid entrained between planes z and z+Δz is also useful in relating the nonlinearity of the formation to known or measurable parameters. The continuity equation is for such fluid is:

$$\int \hat{j} \cdot \underline{n} dA + dM/dt = 0 \quad (9)$$

where $\underline{j}$ is the mass flux, M is the mass and dA is an area on a closed surface. In the borehole, where the fluid is moving because of the tube wave travelling along the borehole, equation (9) relates to a slice of the borehole and effectively translates to:

$$\pi[a + u(z + \Delta z)]^2 \rho(z + \Delta z)v(z + \Delta z) - \quad (10)$$

$$\pi[a + u(z)]^2 \rho(z)v(z) + \frac{\partial}{\partial t}[\pi(a + u(z))^2 \rho(z)\Delta z] = 0,$$

where the first and second terms of equation 10 respectively relate to how much fluid is flowing out of (the top) and into (the bottom) the slice of the borehole, and the third term represents the rate of increase of mass in that slice or region. It is noted that the time derivative term of equation (10) is a partial derivative. If the response of the borehole wall to a static pressure is set forth as:

$$u = (aN_1/2)(p + N_2 p^2 + \ldots)$$

where $N_1$ and $N_2$ are respectively the linear and nonlinear compliances of the formation, equation (10) may be rewritten, to second order in pressure as:

$$\rho_o v_{,z} + \frac{1}{V_T^2} p_{,t} + \frac{1}{V_T^2}(vp_{,z} + pv_{,z}) + \quad (11)$$

$$\left(\frac{2N_1}{c^2} + \frac{\rho_o N_1^2}{2} + 2\rho_o N_1 N_2 - \frac{B_f}{c^2 A_f^2}\right)pp_{,t} = 0$$

where $v_{,z}$, $p_{,t}$, and $P_{,z}$ are respectively notations for dv/dz, dp/dt, and dp/dz, and where $V_T$ is the small amplitude tube wave speed given by $$\frac{1}{V_T^2} = \rho_o\left(\frac{1}{A_f} + N_1\right) = \frac{1}{c^2} + \rho_o N_1 \quad (12)$$

As will be seen hereinafter, an approximation of equation (11) is useful in relating the nonlinearity of the formation to known or measurable parameters.

With the equations set forth above, it is possible to relate the amplitude of the second harmonic generation to the fluid and formation parameters. In particular, the efficiency with which a monochromatic wave of frequency w can generate a second harmonic wave of frequency 2w can be determined. In determining the efficiency of second harmonic generation, it is helpful to eliminate the velocity v from the quadratic terms in equations (8) and (11) above. This can be done by using the relationships implied by the first order equations $$dv/dt = (-1/\rho_o)dp/dz \quad (13)$$

and $$dv/dz = (-1/\rho_o V_T^2)dp/dt. \quad (14)$$

Moreover, because of the borehole geometry, it is assumed that the waves are primarily traveling up or down the borehole. Thus either of equations (13) or (14) implies:

$$v = \pm (1/\rho_o V_T)p \quad (15)$$

and $$\frac{\partial}{\partial t} = \mp V_T \frac{\partial}{\partial z} \quad (16)$$

With these approximations to the quadratic terms, equations (8) and (11) respectively become:

$$\rho_o dv/dt + dp/dz + N_1 pdp/dz = 0 \quad (17)$$

$$\rho_o dv/dz + (1/V_T^2)dp/dt + ((N_1/V_T^2) - \alpha)pdp/dt = 0 \quad (18)$$

where the nonlinear parameter α is defined by:

$$\alpha = \rho_o[(1/A_f^2)(2 + (B_f/A_f)) + (3N_1/A_f) + N_1(2.5N_1 - 2N_2)] \quad (19)$$

with $N_1$ and $N_2$ being the linear and nonlinear compliances of the borehole wall, and $A_f$ and $B_f$ are respectively the bulk modulus of the fluid and a nonlinear parameter of the fluid. Combining equations (16) and (17) yields:

$$(d^2p/dz^2) - (1/V_T^2)d^2p/dt^2 + \alpha(d/dt(pdp/dt)) = 0 \quad (20)$$

with the parameter α governing the degree of nonlinearity of the combined formation and borehole system. Again, it is noted that the effects of the linear and nonlinear behavior of the solid formation are folded into parameters $N_1$ and $N_2$ which are discussed in more detail below.

Equation (20) is a starting point for finding the amplitude of the second harmonic generation. Where a radially independent source generates a monochromatic signal at z=0 which radiates up and down the borehole, the nonlinearity in equation (20) generates a second harmonic which also radiates away from the source. Using the 3-wave mixing theory discussed in G. B. Whitham, *Linear and Nonlinear Waves*, (John Wiley & Sons, New York, 1974), and assuming that the amplitude of the second harmonic is slowly varying as a function of position, the pressure as a function of location and time can be written as:

$$p(z,t) = P_0 \cos(k|z| - w_o t) + f(z) \sin(2k|z| - 2w_o t) + g(z) \cos(2k|z| - 2w_o t) \quad (21)$$

where $k = w_o/V_T$. By ignoring both the z dependence of $P_0$ and the second derivatives of f and g, by setting dg/dz=0, and df/dz = $\pm \alpha V_T w_o P_0^2/4$, and by substituting equation (21) into equation (20), the following is obtained:

$$p(z,t) = P_0 \cos(k|z| - w_o t) + ((\alpha V_T w_o P_0^2/4)|z| + f_0) \sin(2k|z| - 2w_o t) + g_0 \cos(2k|z| - 2w_o t) \quad (22)$$

where $f_0$ and $g_0$ are constants. By requiring that the second harmonic component of the fluid velocity be continuous while the fundamental component is discontinuous due to the monochromatic source, the second harmonic component of dv/dt is also continuous. Imposing continuity on the second harmonic component of dv/dt at z=0 implies $f_0=0$; and $g_0 = [(\alpha V_T^2 - 2N_1)/8] P_0^2$. By substituting equation (20) into equation (22) equation (1) above is obtained:

$$p(z,t) = P_0 \cos(k|z| - w_o t) + P_0^2 [(\alpha V_T w_o/4)|z| \sin(2k|z| - 2w_o t) + (\alpha V_T^2 - 2N_1/8) \cos(2k|z| - 2w_o t)] \quad (23)$$

Also obtained is:

$$v = \pm (1/\rho_o V_T) P_0 \cos(k|z| - w_o t) + (\alpha w_o/4\rho_o) P_0^2 z \sin(2k|z| - 2w_o t) \quad (24)$$

which is useful if the fluid speed rather than the pressure is measured by the detector. It will be appreciated by those skilled in the art that the ratio of the two second harmonic terms in equations (1) or (23) is approximately $2|z|w_o/V_T$. Thus, the amplitude of the second harmonic is approximately independent of the detector distance z provided the detector is located within one wavelength of the source (i.e., $z \leq V_T/w_o$). Thereafter, the second harmonic increases linearly. It is noted that this perturbation theory is not valid once the amplitude of the second harmonic becomes comparable to the amplitude of the fundamental frequency because the law of energy conservation would require the fundamental frequency amplitude to decrease accordingly. It should also be appreciated that if the source is not radially independent of position, then, within the context of linear theory, the source will generate a complex signal involving head waves and higher-order modes. However, these other complex components decay rapidly, so that equation (23) should still hold as long as the sensing distance z is greater than the borehole radius a. Thus, while a source (transmitter) which is centered in the borehole and is radially independent of position (i.e., it has an axial symmetric component) is desirable, it will be appreciated that the invention can be carried out with other sources.

With equation (23) relating the nonlinear parameter α to known or measurable properties of the formation, it is useful to reexamine equation (19) which relates α to linear and nonlinear parameters of both the fluid and formation. In particular, it should be appreciated that if the borehole wall is rigid, i.e., totally consolidated with $N_1$ approaching zero), the second and third terms bracketed in equation (19) will approach zero, and α will be determined by the linear and nonlinear characteristics of the fluid only. On the other hand, if the borehole wall is not rigid, the second and third terms come into play. Since almost no formations of interest have rigid borehole walls, the value of α will be primarily dependent upon the known or determinable values $\rho_o$, $A_f$, $B_f$ and $N_1$, and the unknown nonlinear formation term $N_2$. It will be appreciated that the more nonlinearity the formation exhibits, the larger the absolute value of $N_2$ will become, and the larger α will be. Thus, everything else (e.g., $\rho_o$, $N_1$, $A_f$, $B_f$) being equal, a determination of the relative size of α provides a relative determination as to the nonlinearity and hence relative consolidation of the formation. At the same time, equation (19) permits a determination of the nonlinear parameter $N_2$ if any of the other parameters are varied.

A further analysis of the nonlinear parameter of the formation may be obtained by defining $N_1$ as equal to the inverse of the effective shear modulus of the formation $(1/\mu^*)$, and defining $N_2$ according to:

$$N_2 = \frac{1}{2\mu^*} - \frac{2\mu^* \chi}{\mu_\infty^2} \quad (25)$$

where $\mu_\infty$ is the shear modulus of the formation far from the borehole, and χ is a nonlinear parameter of a formation having a cylindrical hole therein (i.e., near the borehole). Using these definitions, equation (19) can be rewritten as:

$$\alpha = \rho_o \left[ \frac{1}{A_f^2} \left( 2 + \frac{B_f}{A_f} \right) + \frac{3}{\mu^* A_f} + \left( \frac{3}{2(\mu^*)^2} + \frac{4\chi}{\mu_\infty^2} \right) \right] \quad (26)$$

with the the nonlinear formation parameter χ being determinable given a known or determinable shear modulus far from the borehole, a known or determinable effective shear modulus, and known or determinable parameters $A_f$ and $B_f$ as inputs. It should be appreciated that the nonlinear formation parameter χ effectively separates out the effects of the nonlinearity of the fluid from the determination of the nonlinearity of the formation.

It can be established that if there is no altered zone in the formation (i.e., the shear modulus is constant outside the borehole), the nonlinear parameter χ will be zero. On the other hand, as in most situation of interest, if the formation has an altered zone, the nonlinear parameter of the formation having the cylindrical borehole can be defined according to the perturbation theory result:

$$\chi = \frac{6\mu_\infty^2 a}{(\mu^*)^3} \chi_o \int_a^\infty \mu(r) \left( \frac{a}{r^3} - \frac{2a^3}{r^5} \right) dr \quad (27)$$

where $\chi_o$ is a nonlinear property of the rock formation itself (separating out the effect of the existance of the borehole), r is a measure of distance into the formation, and μ(r) is the radially dependent shear modulus of the formation which may be determined according to techniques such as disclosed in co-owned U.S. Pat. No. 5,081,611 to Hornby. Further, the nonlinear parameter of the rock formation $\chi_o$ can be defined according to:

$$\chi_o \equiv -\frac{\lambda + 3\mu + A + 2B}{8(\lambda + 2\mu)} \quad (28)$$

where A and B are nonlinear parameters (third order constants) of the formation as set forth in equations (2) and (3) above, and μ and λ are linear parameters (the Lamé constants). Thus, the nonlinearity of the formation can be quantified as A+2B.

Figure 4:
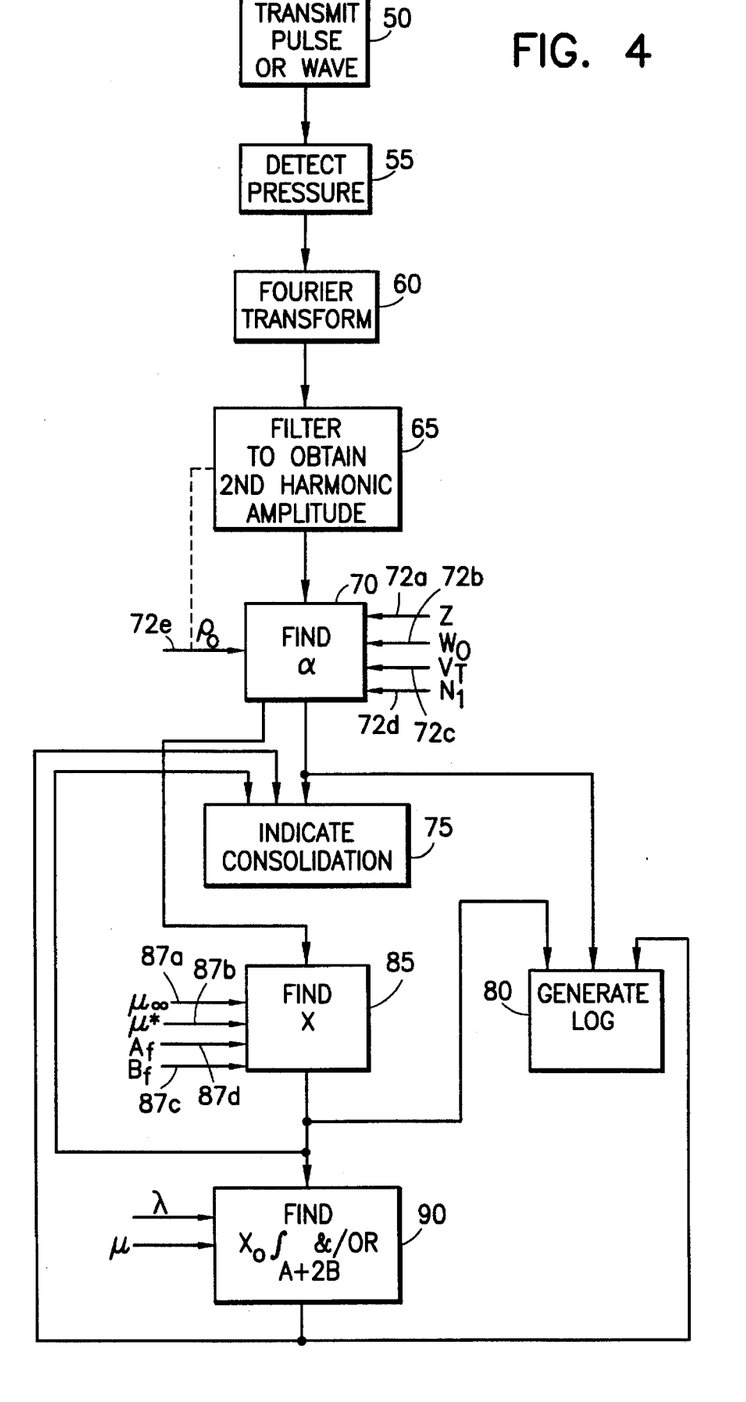
FIG. 4 is a block diagram of the preferred method of finding a nonlinear parameter of the formation according to the invention.

Returning now to the invention, and based on the analysis set forth above, the processing of the data is accomplished according to a preferred method. As seen in FIG. 4, upon transmitting the pulse or continuous wave signal at step 50 and upon detecting the pressure at the receivers at step 55, the received pressure data is preferably Fourier transformed at 60. The Fourier transform of the data is then filtered at 65 to provide an indication of the amplitude of the second harmonic of the frequency of the pulse or continuous wave signal. The amplitude of the second harmonic is then used at 70 to provide the magnitude of a nonlinear borehole fluid/formation system parameter $\alpha$ which relates to the nonlinearity of the formation. As is set forth above, the amplitude of the second harmonic of the detected sonic wave and the indication of the nonlinearity of the formation are related substantially according to equations (1) or (23) above:

$p(z,t) = P_0 \cos(k|z|-w_o t) + P_0^2[(\alpha V_T w_o/4)|z| \sin(2k|z|-2w_o t) + (\alpha V_T^2 - 2N_1/8) \cos(2k|z|-2w_o t)]$ where $p(z,t)$ is the measured acoustic pressure (p) over time (t) at a receiver located in the borehole and at a distance (z) from the sonic source, $\alpha$ is a parameter relating to the nonlinearity of the formation (and the borehole fluid), $w_o$ is the frequency of the pulse or continuous wave signal of the sonic source, $V_T$ is the tube wave velocity, $P_0$ is the maximum amplitude of the tube wave at the fundamental frequency, $k = w_o/V_T$, and $N_1$ is the linear compliance of the borehole wall. When the temporal Fourier transform $F(z,w)$ of $p(z,t)$ is taken, equation (23) is transformed to:

$|F(w)| = P_0 \sigma(w-w_o) + P_0^2\{[\alpha V_T w_o |z|/4]^2 + [\alpha V_T^2 - 2N_1/8]^2\}^{1/2} \sigma(w-2w_o)$     (29)

where $\sigma$ is the usual delta function, and where the first and second terms of the right hand side of equation (29) are the amplitudes of the peaks at $w_o$ and $2w_o$ respectively. The inputs to step 70 include the known distance z 72a from the source to the detector, the known frequency $w_o$ 72b of the source, the tube wave velocity $V_T$ 72c which is measured downhole (from the distance z and the time it takes for the wave to reach the detector from the source), and $N_1$ 72d which is the linear compliance of the borehole wall input 72d. The linear compliance of the borehole wall is either known in advance by relating $N_1$ to the speed of the tube wave and to the density and bulk modulus of the borehole fluid (mud) according to $1/V_T^2 = \rho_o((1/A_f)+N_1)$, where $\rho_o$ is the density of the borehole fluid and $A_f$ is the bulk modulus of the borehole fluid, or determined during logging by taking $N_1$ as being the inverse of the shear modulus of the formation which is obtained by shear wave logging. In addition, the amplitude at the fundamental $P_0$ is found either by obtaining the amplitude at the fundamental frequency from the Fourier transform and equating that to the first term of equation (24), or by calibrating the transmitter so that the amplitude of the fundamental wave is known. Thus, $P_0$ is taken as another known or determinable value input 72e into equation (29) from which $\alpha$ is determined at step 70.

Once the magnitude of the nonlinear variable $\alpha$ which relates to formation nonlinearity is determined, that magnitude may be used at 75 to provide an indication of the relative consolidation of the formation. If measurements are made over the length of a borehole, a log of the relative formation nonlinearity of the formation can be produced at 80. It is noted that the fluid properties will not typically change over the length of the borehole, so that the relative values of $\alpha$ will provide a good indication of relative formation nonlinearity. In addition to finding the magnitude of $\alpha$, or as an alternative thereto, a quantitative value for the nonlinear formation parameter $\chi$ can be found at 85 using equation (26), with the known or determinable shear modulus far from the borehole as one input 87a, the effective shear modulus as a second input 87b, and parameters $A_f$ and $B_f$ as inputs 87c and 87d. Again, if determinations are made along the length of the borehole, a log of $\chi$ can be produced at 80. Further, in addition or as an alternative to finding $\alpha$ or $\chi$, determinations can be made of $\chi_o$ times the integral term of equation 27, and/or A+2B at 90 by using equations (27), and (28) to provide a quantitative value for the formation nonlinearity. As will be appreciated by those skilled in the art, in order to determine $\chi_o$ times the integral term, the radius of the borehole must be provided as an input as must the shear modulus as a function of radius. In order to determine A+2B, the Lamé constants must be provided as inputs.

It should be appreciated that in order to obtain a quantitative value for the nonlinear parameter of the fluid/formation system or for the formation itself, the receiving transducer is preferably calibrated. In particular, the measurement actually made by the receiving transducer in the borehole is a voltage which typically takes the form of a sinusoid. Because different transducers will provide different voltage outputs while measuring the same pressure, calibration of the receiving transducer(s) is desirable so that the obtained voltage can be directly correlated to a measured pressure. Of course, if it is desired only to obtain a relative measurement, such a calibration is not required. It will also be appreciated that in lieu of calibrating the receiving transducer, the transmitting transducer may be calibrated. Where the transmitting transducer is calibrated, in order to correlate the voltage at the receiver to the measured pressure, the system may be assumed to have no loss, or account may be made for the loss in the system.

There have been provided herein methods and apparatus for measuring the nonlinearity of a formation via use of a sonic borehole logging tool. While particular embodiments of the invention have been described, it is not intended that the invention be limited thereto, as it is intended that the invention be as broad in scope as the art will allow and that the specification be read likewise. Thus, while the invention was described as utilizing the amplitude of the second harmonic for determining nonlinearity, it will be appreciated that other harmonics could also be utilized. Also, while the invention was described as utilizing a Fourier transform to find the amplitude of the second harmonic, it will be appreciated that other techniques such as using high and low pass filters could be utilized instead of the Fourier transform. In addition, while particular hardware was described as being preferred, it will be appreciated that other types of sources and receivers, as well as processors could be utilized, and that the invention is not necessarily limited to wireline applications. Likewise, while certain variable inputs relating to the borehole mud (fluid) and the formation required for making qualitative and quantitative determinations of nonlinearity were described as being known in advance or being determinable via known certain known logging techniques, it will be appreciated that other mechanisms for determining the borehole mud (fluid) parameters could be utilized, as well as for determining the shear modulus and other parameters of the formation. Further, while particular equations were described governing the transfer of energy from the fundamental frequency to the second harmonic in a tube wave moving through a borehole in a nonlinear formation, it will be appreciated that various approximations were made, and that other equations with or without the approximations, as well as other approximations could be utilized without varying from the basic concept of the invention. Indeed, while the provided equations may be used for higher frequency applications, it will be appreciated that the equations could also be changed where the low frequency assumptions do not apply. It will also be appreciated that while the nonlinearity of the formation relates to the consolidation of the formation, the application of the invention is not so limited, as the nonlinearity may also relate to other formation parameters such as the ease at which the formation can be fractured, etc. It will therefore be appreciated by those skilled in the art that yet other modifications could be made to the provided invention without deviating from its spirit and scope as so claimed.

We claim:

1. A method for determining an indication of a nonlinear property of a formation traversed by a fluid-filled borehole by using a sonic borehole tool having a sonic transmitter and a sonic receiver, comprising:

a) generating with the sonic transmitter a sonic signal having multiple cycles of a wave of a predetermined frequency, the sonic signal generating a tube wave of the predetermined frequency in the fluid-filled borehole;

b) measuring at the sonic receiver an amplitude of a parameter of the tube wave;

c) determining from the amplitude of the measured parameter of the tube wave an indication of nonlinearity of the formation according to the following relationship:

$$p(z,t)=P_0 \cos(k|z|-w_o t)+ P_0^2[(\alpha V_T w_o/4)|z| \sin(2k|z|-2w_o t)+ (\alpha V_T^2-2N_1/8) \cos(2k|z|-2w_o t)]$$

where $p(z,t)$ is a measured acoustic pressure (p) over time (t) at the sonic receiver which is located at a distance (z) from the sonic transmitter, $\alpha$ is a parameter which is a function of the nonlinearity of the formation, $w_o$ is the predetermined frequency, $V_T$ is the velocity of the tube wave of the predetermined frequency, $P_0$ is the maximum amplitude of the tube wave at the predetermined frequency, $k=w_o/V_T$, and $N_1$ is a parameter related to the linear compliance of a wall of the fluid-filled borehole, the relationship relating the measured amplitude to an amplitude of a harmonic tube wave having a frequency which is a second harmonic of the predetermined frequency and which is generated in the fluid-filled borehole by the tube wave of the predetermined frequency and due to a nonlinear property of the formation.

2. A method for determining an indication of a nonlinear property of a formation traversed by a fluid-filled borehole by using a sonic borehole tool having a sonic transmitter and a sonic receiver, comprising:

a) generating with the sonic transmitter a sonic signal having multiple cycles of a wave of a predetermined frequency, the sonic signal generating a tube wave of the predetermined frequency in the fluid-filled borehole;

b) measuring tube wave acoustic pressure amplitude at the sonic receiver;

c) determining, from the tube wave acoustic pressure amplitude, an indication of nonlinearity of the formation according to a relationship relating the measured amplitude to an amplitude of a harmonic tube wave having a frequency which is a second harmonic of the predetermined frequency and which is generated in the fluid-filled borehole by the tube wave of the predetermined frequency and due to a nonlinear property of the formation, including Fourier transforming the measured acoustic pressure of the tube wave to provide a Fourier transformed signal, obtaining from the Fourier transformed signal an indication of the amplitude of the Fourier transformed signal at the second harmonic of the predetermined frequency and using the following relationship:

$$|F(w)|=P_0\delta(w-w_o)+P_0^2\{[\alpha V_T w_o|z|/4]^2 +[\alpha V_T^2-2N_1/8]^2\}^{1/2}\delta(w-2w_o)$$

where $F(z,w)$ is a temporal Fourier transform of $p(z,t)$ obtained by the Fourier transforming step, where $p(z,t)$ is a measured acoustic pressure (p) over time (t) at the sonic receiver which is located at a distance (z) from the sonic transmitter, $\delta$ is a delta function, $\alpha$ is a parameter which is a function of the nonlinearity of the formation, $w_o$ is the predetermined frequency, $V_T$ is the tube wave velocity of the tube wave, $N_1$ is a parameter related to the compliance of a wall of the borehole, and $P_0$ is the maximum amplitude of the tube wave at the predetermined frequency.

3. An apparatus for determining an indication of a nonlinear property of a formation traversed by a fluid-filled borehole, comprising:

a) a sonic borehole tool having a sonic transmitter means and a sonic receiver means, the sonic transmitter means for generating a sonic signal having multiple cycles of a wave of a predetermined frequency, wherein the sonic signal generates a tube wave of the predetermined frequency in the fluid-filled borehole, and the sonic receiver means for measuring an amplitude of acoustic pressure of the tube wave; and b) processing means coupled to said sonic receiver means for determining from said amplitude of the measured parameter of said tube wave an indication of nonlinearity of the formation according to the following relationship:

$$p(z,t)=P_0 \cos(k|z|-w_o t)+ P_0^2[(\alpha V_T w_o/4)|z| \sin(2k|z|-2w_o t)+ (\alpha V_T^2-2N_1/8) \cos(2k|z|-2w_o t)]$$

where $p(z,t)$ is a measured acoustic pressure (p) over time (t) at the sonic receiver which is located at a distance (z) from the sonic transmitter, $\alpha$ is a parameter which is a function of the nonlinearity of the formation, $w_o$ is the predetermined frequency, $V_T$ is the velocity of the tube wave of the predetermined frequency, $P_0$ is the maximum amplitude of the tube wave at the predetermined frequency, $k=w_o/V_T$, and $N_1$ is a parameter related to the linear compliance of a wall of the fluid-filled borehole, the relationship relating the measured amplitude to an amplitude of a harmonic tube wave having a frequency which is a second harmonic of the predetermined frequency and which is generated in the fluid-filled borehole by the tube wave of the predetermined frequency and due to a nonlinear property of the formation.

4. An apparatus for determining an indication of a nonlinear property of a formation traversed by a fluid-filled borehole, comprising:

a) a sonic borehole tool having a sonic transmitter means and a sonic receiver means, the sonic transmitter means for generating a sonic signal having multiple cycles of a wave of a predetermined frequency, wherein the sonic signal generates a tube wave of the predetermined frequency in the fluid-filled borehole, and the sonic receiver means for measuring an amplitude of an acoustic pressure of the tube wave; and b) processing means coupled to the sonic receiver means for determining from the amplitude of the measured acoustic pressure of the tube wave an indication of nonlinearity of the formation according to a relationship which relates the measured amplitude to an amplitude of a harmonic tube wave having a frequency which is a second harmonic of the predetermined frequency and which is generated in the fluid-filled borehole by the tube wave of the predetermined frequency and due to a nonlinear property of the formation, including Fourier transforming the measured acoustic pressure of the tube wave to provide a Fourier transformed signal, obtaining from the Fourier transformed signal an indication of the amplitude of the Fourier transformed signal at the second harmonic of the predetermined frequency and using the following relationship:

$$|F(w)|=P_0\delta(w-w_o)+P_0^2\{[\alpha V_T w_o|z|/4]^2+[\alpha V_T^2-2N_1/8]^2\}^{1/2}\delta(w-2w_o)$$

where F(z,w) is a temporal Fourier transform of p(z,t) obtained by the Fourier transforming step, where p(z,t) is a measured acoustic pressure (p) over time (t) at the sonic receiver which is located at a distance (z) from the sonic transmitter, $\delta$ is a delta function, $\alpha$ is a parameter which is a function of the nonlinearity of the formation, $w_o$ is the predetermined frequency, $V_T$ is the tube wave velocity of the tube wave, $N_1$ is a parameter related to the compliance of a wall of the borehole, and $P_0$ is the maximum amplitude of the tube wave at the predetermined frequency.

5. A method for determining an indication of relative consolidation of a formation traversed by a fluid-filled borehole by using a sonic borehole tool having a sonic transmitter and a sonic receiver, comprising:

a) generating with the sonic transmitter a sonic signal having multiple cycles of a wave of a predetermined frequency, the sonic signal generating a tube wave of the predetermined frequency in the fluid-filled borehole;

b) measuring at the sonic receiver an amplitude of a parameter of the tube wave;

c) determining from the amplitude of the measured parameter of the tube wave an indication of nonlinearity of the formation according to a relationship which relates the measured amplitude to an amplitude of a harmonic tube wave having a frequency which is a multiple of the predetermined frequency and which is generated in the fluid-filled borehole by the tube wave of the predetermined frequency and due to a nonlinear property of the formation; and d) using the indication of nonlinearity of the formation to determine an indication of relative consolidation of the formation.

6. An apparatus for determining an indication of relative consolidation of a formation traversed by a fluid-filled borehole, comprising:

a) a sonic borehole tool having a sonic transmitter means and a sonic receiver means, the sonic transmitter means for generating a sonic signal having multiple cycles of a wave of a predetermined frequency, wherein the sonic signal generates a tube wave of the predetermined frequency in the fluid-filled borehole, and the sonic receiver means for measuring an amplitude of a parameter of the tube wave; and b) processing means coupled to the sonic receiver means for determining from the amplitude of the measured parameter of the tube wave an indication of nonlinearity of the formation according to a relationship which relates the measured amplitude to an amplitude of a harmonic tube wave having a frequency which is a multiple of the predetermined frequency and which is generated in the fluid-filled borehole by the tube wave of the predetermined frequency and due to a nonlinear property of the formation, and for using the indication of nonlinearity of the formation to determine an indication of relative consolidation of the formation.

7. A method according to claim 5, wherein: said parameter of said tube wave is an acoustic pressure of said tube wave.

8. A method according to claim 5, wherein: said frequency which is a multiple is a second harmonic of said predetermined frequency.

9. A method according to claim 8, wherein:

said step of determining includes

Fourier transforming the measured acoustic pressure of said tube wave to provide a Fourier transformed signal, obtaining from said Fourier transformed signal an indication of the amplitude of said Fourier transformed signal at said second harmonic of said predetermined frequency.

10. A method according to claim 9, wherein:

said step of determining further includes obtaining from said Fourier transformed signal an indication of the amplitude of said Fourier transformed signal at said predetermined frequency.

11. A method according to claim 2, wherein: said step of determining further includes obtaining from said Fourier transformed signal an indication of the amplitude of said Fourier transformed signal at said predetermined frequency, wherein $P_0$ is said indication of the amplitude of said Fourier transformed signal at said predetermined frequency.

12. A method according to claim 1, wherein: said step of determining further includes solving said relationship or a Fourier transform thereof for $\alpha$, and using $\alpha$ to solve for $N_2$ according to $$\alpha=[(1/A_f^2)(2+(B_f/A_f))+(3N_1/A_f)+N_1(2.5N_1-2N_2)]$$

where $N_1$ and $N_2$ are respectively a linear parameter and a nonlinear parameter related to the compliance of the formation, and $A_f$ and $B_f$ are respectively the bulk modulus and a nonlinear parameter related to fluid in the fluid-filled borehole.

13. A method according to claim 1, wherein: said step of determining further includes solving said relationship or a Fourier transform thereof for $\alpha$, and using $\alpha$ to solve for $\chi$ according to $$\alpha=\rho_o\left[\frac{1}{A_f^2}\left(2+\frac{B_f}{A_f}\right)+\frac{3}{\mu^* A_f}+\left(\frac{3}{2(\mu^*)^2}+\frac{4\chi}{\mu_\infty^2}\right)\right]$$

where $A_f$ and $B_f$ are respectively the bulk modulus and a nonlinear parameter related to fluid in the fluid-filled borehole, $\rho_0$ is the density of the borehole fluid in an undeformed state, $\mu_{oo}$ is a shear modulus of the formation away from the fluid-filled borehole, $\mu^*$ is an effective shear modulus of the formation, and $\chi$ is a nonlinear parameter of the formation having the borehole.

14. A method according to claim 13, wherein:

said step of determining further includes using $\chi$ to solve for a function of $\chi_o$ according to $$\chi=\frac{6\mu_\infty^2 a}{(\mu^*)^3}\chi_o\int_a^\infty \mu(r)\left(\frac{a}{r^3}-\frac{2a^3}{r^5}\right)dr$$

where r is a measure of distance into the formation, a is a radius of the fluid-filled borehole, and $\chi_o$ is a nonlinear parameter of the formation.

15. A method according to claim 14, wherein:

said step of determining further includes using $\chi_o$ to solve for A+2B according to $$\chi_o \equiv -\frac{\lambda + 3\mu + A + 2B}{\chi(\lambda + 2\mu)}$$

where $\lambda$ and $\mu$ are linear parameters of the formation, and A and B are third order nonlinear parameters of the formation.

16. A method according to claim 5, wherein: said steps of generating, measuring, and determining are repeated at various locations along the fluid-filled borehole, and said method further comprises producing a log indicative of said determined indications of nonlinearity along the fluid-filled borehole.

17. A method according to claim 5, wherein: said steps of generating, measuring, determining, and using are repeated at various locations along the fluid-filled borehole, and said method further comprises producing a log indicative of said relative consolidation of said formation along the fluid-filled borehole.

18. An apparatus according to claim 6, wherein: said sonic receiver means measures an acoustic pressure of said tube wave, said frequency which is a multiple is a second harmonic of said predetermined frequency, and said processing means determines said indication of nonlinearity by Fourier transforming the measured acoustic pressure of said tube wave in order to provide a Fourier transformed signal, and by obtaining from said Fourier transformed signal an indication of the amplitude of said Fourier transformed signal at said second harmonic of said predetermined frequency.

19. An apparatus according to claim 13, wherein: said processing means determines said indication of nonlinearity by solving said relationship or the transform thereof for $\alpha$, and using $\alpha$ to solve for $N_2$ according to $$\alpha = [(1/A_f^2)(2+(B_f/A_f))+(3N_1/A_f)+ N_1(2.5N_1-2N_2)]$$

where $N_1$ and $N_2$ are respectively a linear parameter and a nonlinear parameter related to the compliance of the formation, and $A_f$ and $B_f$ are respectively the bulk modulus and a nonlinear parameter related to fluid in the fluid-filled borehole.

20. An apparatus according to claim 3, wherein: said processing means determines said indication of nonlinearity by solving said relationship or a Fourier transform thereof for $\alpha$, and using $\alpha$ to solve for $\chi$ according to where $A_f$ and $B_f$ are respectively the bulk modulus and a nonlinear parameter related to fluid in the fluid-filled borehole, $\rho_0$ is the density of the borehole fluid in an undeformed state, $\mu_{oo}$ is a shear modulus of the formation away from the fluid-filled borehole, $\mu^*$ is an effective shear modulus of the formation, and $\chi$ is a nonlinear parameter of the formation having the borehole.

21. An apparatus according to claim 20, wherein:
said processing means determines said indication of nonlinearity by using $\chi$ to solve for a function of $\chi_o$ according to where r is a measure of distance into the formation, a is a radius of the fluid-filled borehole, and $\chi_o$ is a nonlinear parameter of the formation.

22. An apparatus according to claim 21, wherein:
said processing means determines said indication of nonlinearity by using $\chi_o$ to solve for A+2B according to
where $\lambda$ and $\mu$ are linear parameters of the formation, and A and B are third order nonlinear parameters of the formation.

23. An apparatus according to claim 6, wherein: said sonic transmitter means has an axially symmetric component.

24. An apparatus according to claim 6, wherein: one of said sonic transmitter means and said sonic receiver means is calibrated.

* * * * *

UNITED STATES PATENT AND TRADEMARK OFFICE
CERTIFICATE OF CORRECTION

PATENT NO.:     5,485,431

DATED:          January 16, 1996

INVENTOR(S):    Johnson et al.

It is certified that errors appear in the above-identified patent and that said Letters Patent is hereby corrected as shown below:

Column 15, claim 19, line 1, delete "13" and insert -- 3 --.

Claims 20, 21, and 22 should read as follows:

20.  An apparatus according to claim 3, wherein: said processing means determines said indication of nonlinearity by solving said relationship or a Fourier transform thereof for $\alpha$, and using $\alpha$ to solve for $\chi$ according to $$\alpha = \rho_0 \left[ \frac{1}{A_f^2}\left(2 + \frac{B_f}{A_f}\right) + \frac{3}{\mu^* A_f} + \left(\frac{3}{2(\mu^*)^2} + \frac{4\chi}{\mu_\infty^2}\right)\right]$$

where $A_f$ and $B_f$ are respectively the bulk modulus and a nonlinear parameter related to fluid in the fluid-filled borehole, $\rho_0$ is the density of the borehole fluid in an undeformed state, $\mu_\infty$ is a shear modulus of the formation away from the fluid-filled borehole, $\mu^*$ is an effective shear modulus of the formation, and $\chi$ is a nonlinear parameter of the formation having the borehole.

UNITED STATES PATENT AND TRADEMARK OFFICE
CERTIFICATE OF CORRECTION

PATENT NO.: 5,485,431

DATED: January 16, 1996

INVENTOR(S): Johnson et al.

Continued...

21. An apparatus according to claim 20, wherein: said processing means determines said indication of nonlinearity by using $\chi$ to solve for a function of $\chi_0$ according to $$\chi = \frac{6\mu_\infty^2 a}{(\mu^*)^3} \chi_0 \int_a^\infty \mu(r) \left( \frac{a}{r^3} - \frac{2a^3}{r^5} \right) dr$$

where $r$ is a measure of distance into the formation, $a$ is a radius of the fluid-filled borehole, and $\chi_0$ is a nonlinear parameter of the formation.

Signed and Sealed this

Twenty-first Day of October 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,485,431
DATED : January 16, 1996
INVENTOR(S) : Johnson, et. al.

It is certified that error appears in the above-indentified patent and that said Letters Patent is hereby corrected as shown below:

22. An apparatus according to claim 21, wherein: said processing means determines said indication of nonlinearity by using $\chi_0$ to solve for $A + 2B$ according to $$\chi_0 \equiv -\frac{\lambda + 3\mu + A + 2B}{8(\lambda + 2\mu)}$$

where $\lambda$ and $\mu$ are linear parameters of the formation, and $A$ and $B$ are third order nonlinear parameters of the formation.

Signed and Sealed this

Twenty-first Day of October 1997

Attest:

BRUCE LEHMAN

*Attesting Officer*　　*Commissioner of Patents and Trademarks*

UNITED STATES PATENT AND TRADEMARK OFFICE
CERTIFICATE OF CORRECTION

PATENT NO.:     5,485,431

DATED:          January 16, 1996

INVENTOR(S):    Johnson et al.

It is certified that errors appear in the above-identified patent and that said Letters Patent is hereby corrected as shown below:

Column 12, line 3, the equation should read as follows:

$$|F(w)| = P_0 \delta(w - w_0) + P_0^2 \left\{ \left[ \alpha V_T w_0 |z|/4 \right]^2 + \left[ \alpha V_T^2 - 2N_1/8 \right]^2 \right\}^{1/2} \delta(w - 2w_0)$$

Column 15, line 2, the equation should read as follows:

$$\chi_0 \equiv -\frac{\lambda + 3\mu + A + 2B}{8(\lambda + 2\mu)}$$

Signed and Sealed this

Sixteenth Day of December, 1997

*Attest:*

BRUCE LEHMAN

*Attesting Officer*   *Commissioner of Patents and Trademarks*